Feb. 4, 1969  R. S. JONES  3,425,505
CUSHION AIR REVERSE FLOW PREVENTING MEANS
Filed March 3, 1966

United States Patent Office 3,425,505
Patented Feb. 4, 1969

3,425,505
CUSHION AIR REVERSE FLOW
PREVENTING MEANS
Richard Stanton Jones, Cowes, Isle of Wight, England, assignor to Westland Aircraft Limited, Yeovil, Somerset, England
Filed Mar. 3, 1966, Ser. No. 531,391
Claims priority, application Great Britain, May 3, 1965, 18,564/65
U.S. Cl. 180—118                                13 Claims
Int. Cl. B60v 1/14, 1/18

ABSTRACT OF THE DISCLOSURE

A ground effect vehicle includes a pressure source which supplies gas to a supporting gas cushion through a ducting system. Hinged flaps, each of which when closed form a continuum of a duct-forming surface, are movable to an extended position where they close off the ducts to prevent gas from the cushion from passing through the ducts.

---

This invention relates to vehicles which, during at least part of their operation, act as air cushion vehicles when they are supported by one or more cushions of pressurised gaseous fluid. More particularly, the invention relates to improvement to the air intakes and ducts through which air passes to supply the cushion or cushions.

It is usual for the air which forms the air cushion or cushions to be pressurised by means of one or more lift fans driven by power plant means and arranged to supply the pressurised air to the plenum chamber of the vehicle. In vehicles which are provided with more than one lift fan it is sometimes desirable, or, if an engine fails it may be necessary, to stop one of the lift fans. However, in this condition there will be a large loss of pressurised air from the cushion through the air intake of the non-operating lift fan and it is an object of the invention to substantially reduce or prevent this loss of air.

Also, an air cushion vehicle having only a single lift fan will possess an enhanced element of safety if the air from the air cushion is prevented from escaping through the air intake when the lift fan is not operating. An emergency blower, driven by an auxiliary power unit, will provide sufficient cushion air to partially support the vehicle, enabling it to be towed at a higher speed than would otherwise be possible or enabling the vehicle to float, partially cushionborne, over submerged obstructions.

The present invention provides a vehicle which, in one phase of operation, receives support from at least one ground effect cushion of pressurized gaseous fluid, said vehicle including a pressure source for supplying pressurized gaseous fluid to the cushion by way of at least one duct, means disposed in said duct and forming a portion of the walls thereof including obturator means for controlling passage of gaseous fluid therethrough, said obturator means comprising at least two obturating members and means for moving said obturating members between a first, stowed position and a second, extended position, said obturator members in the stowed positions thereof constituting means for forming a continuum of a surface of the duct wall and in the extended positions thereof constituting means for completely closing off said duct to prevent the gaseous fluid from passing through the duct whereby leakage from the cushion through the duct is prevented.

In another aspect the invention provides a vehicle which in one phase of its operation acts as an air cushion vehicle having at least one duct to conduct air from at least one air intake to at least one air cushion for supporting the vehicle and at least one pressure generating means situated within the duct or ducts, the said duct or ducts having valve means to minimise the escape of pressurized air from the cushion or cushions when the pressure generating means is not operating, the said valve means being arranged to fold when in an inoperative position into a substantially flat plane adjacent to a wall of the duct.

Preferably the duct and the pressure generating means are in the form of at least one air intake opening in the skin of the vehicle and a passage leading to the inlet of at least one lift fan which is driven by at least one power plant. The invention provides an obturator member within each passage or duct connecting each air intake opening to the inlet of the lift fan. Such obturator member may be in the form of a flap, shutter, iris, or the like.

In one arrangement a flap forming a non-return valve is hingeably attached to the duct fairing so that, during operation of the vehicle, the pressure difference between atmospheric pressure and the lift fan inlet pressure assists the valve plate to open and, alternately, a flow of air from the plenum chamber of the vehicle to the atmosphere through the air intake duct assists the valve plate to close.

The operation of the obturator members is controlled by the commander or other member of the crew of the vehicle, and the motive power for moving the valve flaps may be provided by any suitable method, for example, by mechanical linkage or by an electrical, hydraulic or pneumatic system, or any combination of such systems.

Alternately or additionally the means of actuating the obturator member may be linked to the lift fan or its driving mechanism, such that when the fan is stopped the obturator member closes. However, provision must be made for some of the cushion air to escape through the air intake ducts during the normal setting down procedure at the end of a sortie. Therefore, automatic obturating means are provided with a controllable overriding arrangement.

Further objects and advantages of the invention will become more readily apparent from the following detailed description, with reference to the accompanying drawings, which is by way of example, and in which:

FIGURES 1 and 2 are the bow end elevation and the plan, respectively, of an air cushion vehicle having a plurality of cushion air intakes.

FIGURE 3 is a section in a vertical plane on the line III—III of FIGURE 2, on a different scale, of a bifurcated cusion air intake having air intake flaps. It should be noted that the flap in one half of the intake is shown open, while that in the other half of the air intake is shown closed. The flaps are shown in these positions for the purposes of illustration only. During operation they would be either both open or both closed.

FGURE 4, which is located on the same drawing sheet as FIGURE 1, is an illustration of an air intake flap viewed in the direction of the arrow in FIGURE 3.

Figure 1:
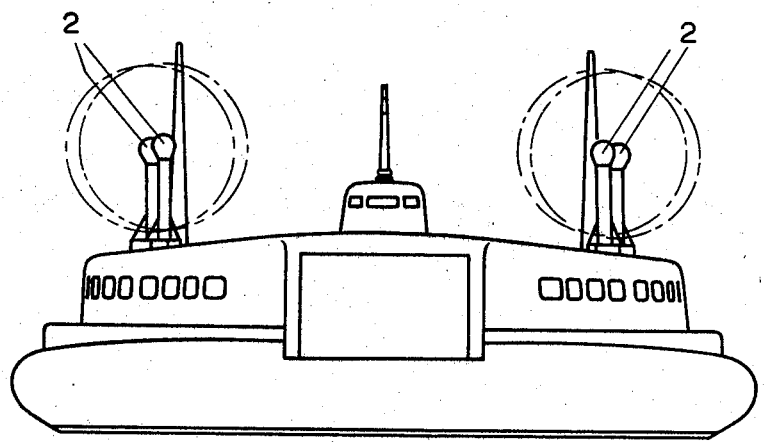
Figure 4:
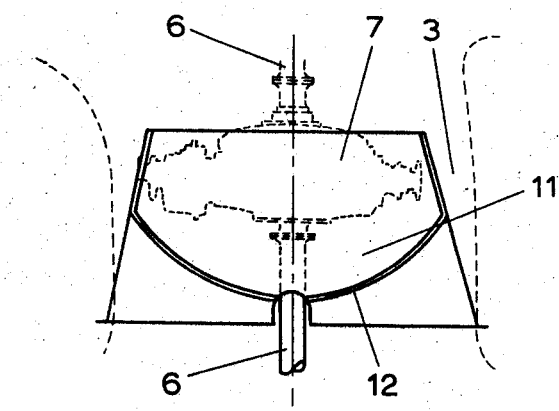
Figure 2:
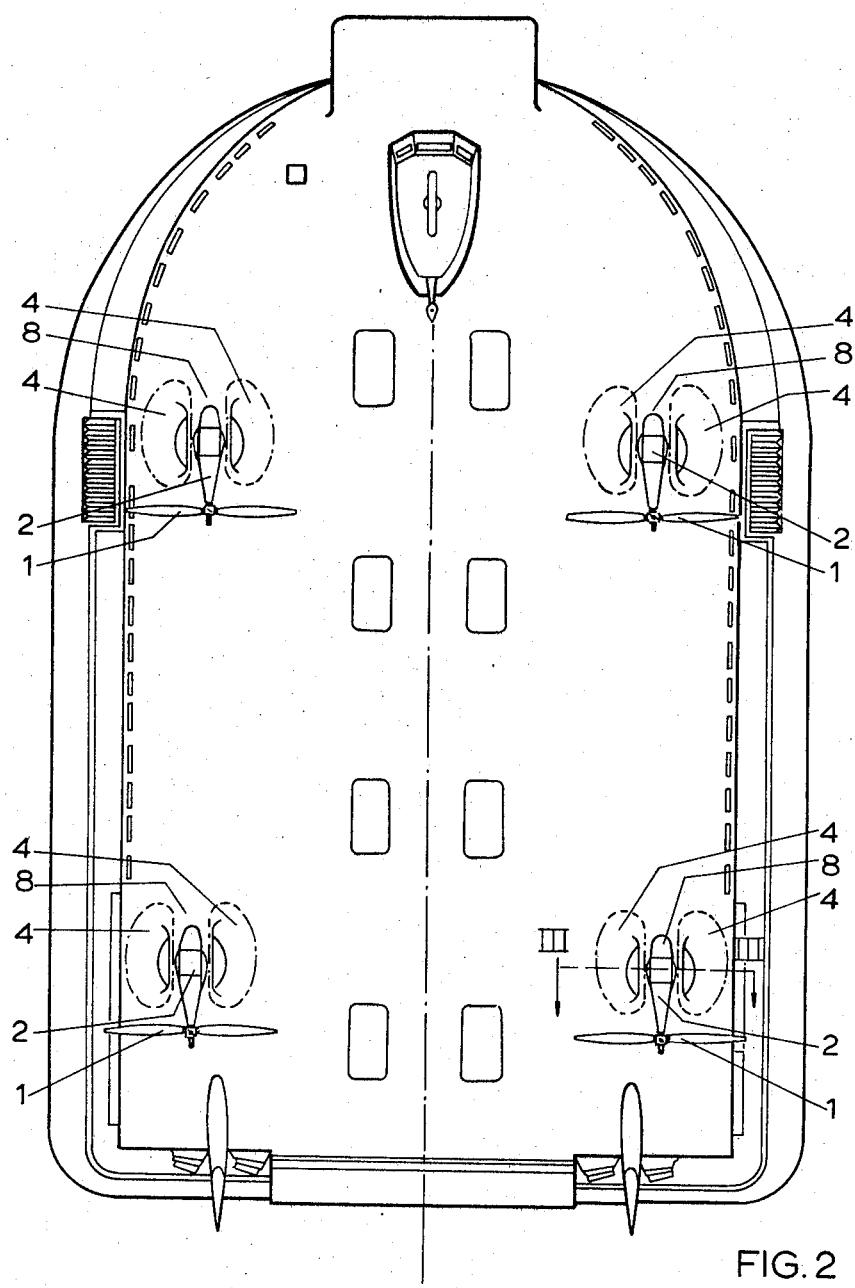
Figure 3:
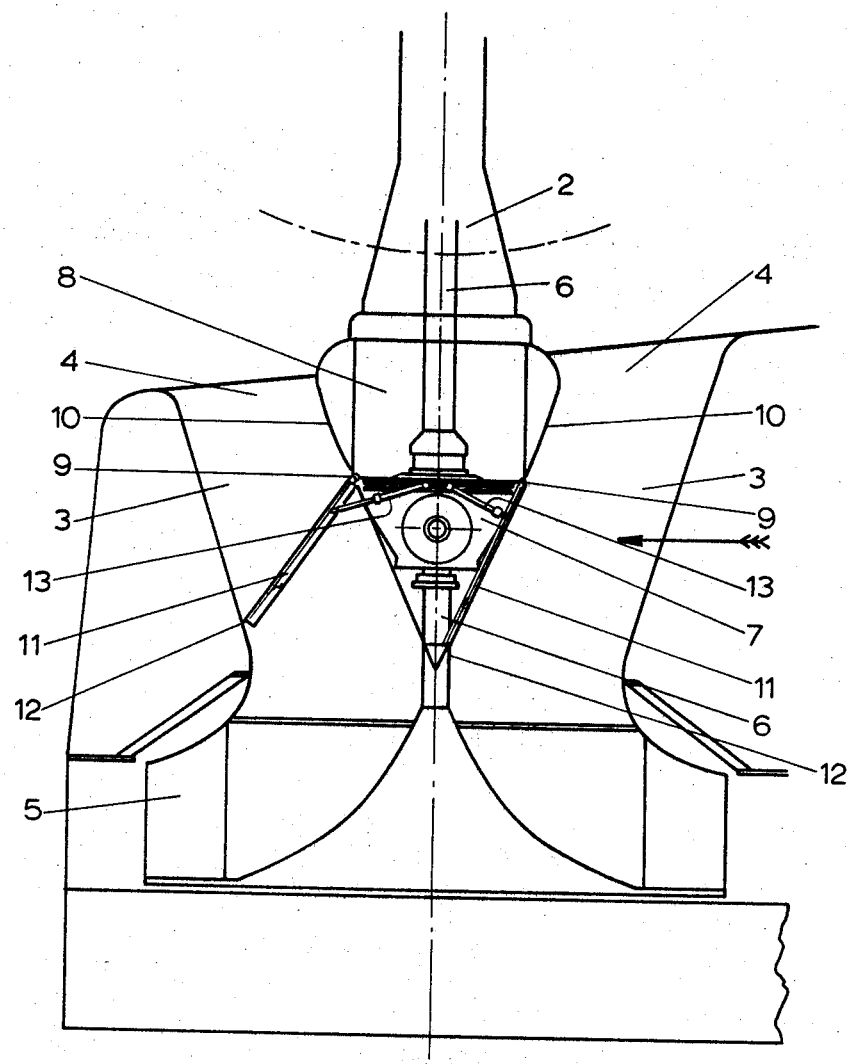

In carrying one embodiment of the invention into effect I provide an air cushion vehicle generally illustrated in FIGURES 1 and 2 having four propulsion propellers 1, each mounted on a pylon 2. Cushion air intake ducts 3 lead from intake orifices 4 in the upper surface of the air cushion vehicle to the inlet of the lift fans 5, one of which is shown in FIGURE 3.

Each propulsion propeller 1 is coupled to a lift fan 5 by shafting 6 and a gearbox 7, and the propeller/fan combination is driven by a power plant (not shown), consisting of one or more engines.

Each pair of intake orifices 4 and intake ducts 3 form the air intake for one lift fan 5 and they take the form of faired, substantially rectangular, orifices 4 in side by side relationship with each other and downwardly inclined ducts 3. The space 8 between each pair of orifices 4 provides a platform on which is mounted the propeller pylon 2 and below this platform the space 8 is occupied by a gearbox 7 and the shafting 6 which provides part of the power transmission from the power plant to the propellers 1 and to the lift fans 5.

Below the gearbox 7 each pair of the faired, substantially rectangular ducts 3 merge together and lead to the lift fan inlet so that, as can be seen from FIGURE 3, in vertical cross-section each pair of ducts 3 are arranged as a V and form a bifurcated air intake.

Mounted on hinges 9 attached to the fairing 10 around each gearbox 7 are two valve flaps 11, one flap in each half of the bifurcated air intake, arranged so that they can swing across their respective halves of the air intake. Each valve flap 11 is so shaped that when it is swung away from the gearbox 7, the full length of its free edge 12 will meet the opposite wall of the duct 3 and the flap will form a barrier to the passage of air through the duct. The length of each flap 11, from the line of the hinges 9 to the free edge 12, is greater than the distance between the gearbox fairing 10 and the outer wall of the duct 3, so that air pressure on the lift fan 5 side of the flap 11 forces the free edge 12 tightly against the outer wall and produces an effective air seal.

In its retracted position each flap 11 forms a part of the gearbox fairing and acts as part of the wall of the duct.

Figure 5:
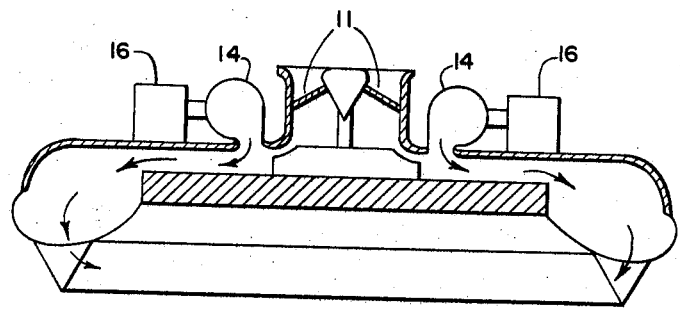
FIGURE 5 is a sectional view of an embodiment of the invention wherein auxiliary blowers are utilized.

FIGURE 5 shows an embodiment where auxiliary blowers 14 driven by auxiliary power units 16 supply air to the cushion of the vehicle when the flaps 11 are closed. As set forth hereinbefore the use of auxiliary blowers 14 permits towing of the vehicle at higher speeds than otherwise would be possible and enables the vehilce to float over submerged obstructions.

Each flap 11 is moved between its retracted and its extended position by two jacks 13, which may be either hydraulically or pneumatically operated, and which are controlled by the commander or other member of the crew of the air cushion vehicle, so that any individual bifurcated pair or any combination of bifurcated pairs of air intakes may be closed.

Figure 6:
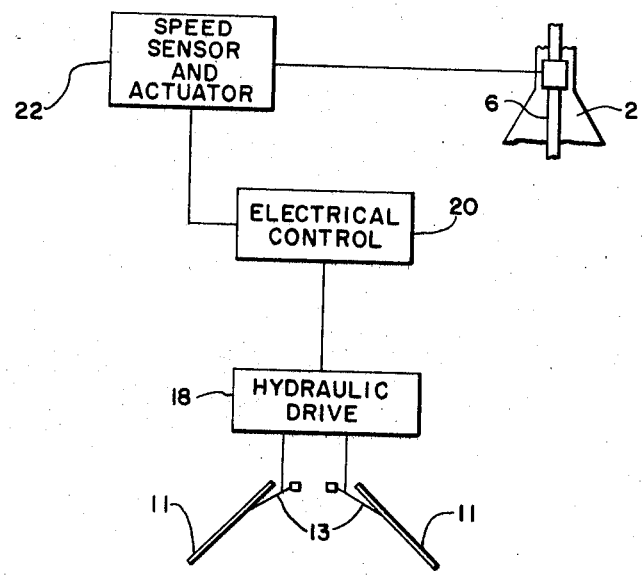
FIGURE 6 is a schematic diagram of a control system for the valve flaps of FIGURE 3.

FIGURE 6 shows a hydraulic drive 18 controlled through an electrical control 20 which may merely comprise an electrical relay for controlling the hydraulic drive motor. Electrical control 20 is actuated by a speed sensing device 22 which is linked to the fan shafting 6 so that the flaps 11 are closed when the fan speed falls below a predetermined level.

I claim as my invention:

1. A vehicle which, during at least one phase of operation, receives support from at least one ground effect cushion of pressurized gaseous fluid, said vehicle including means for supplying pressurized gaseous fluid to said cushion said means including at least one duct having an intake open to atmosphere and an outlet for discharging pressurized gaseous fluid to the ground effect cushion, means disposed in said duct and forming a portion of the walls thereof including obturator means for controlling passage of gaseous fluid therethrough, said obturator means comprising at least two obturating members in said duct and means for moving said obturating members between a first, stowed position and a second, extended position, said obturator members in the stowed positions thereof constituting means for forming a continuum of a surface of the duct wall and in the extended positions thereof constituting means for completely closing off said duct to prevent gaseous fluid from the cushion from passing through the duct to the atmosphere whereby leakage from the cushion through the duct is prevented.

2. A vehicle in accordance with claim 1 wherein said obturating members comprise hinged flaps.

3. A vehicle as claimed in claim 2 wherein the distance from the hinge line to the free edge of the obturating members is greater than the distance across the duct from the hinge line of the obturating members to the wall of the duct.

4. A vehicle as claimed in claim 1 wherein said means for moving said obturating members between the stowed position and the extended position comprises electrical means.

5. A vehicle as claimed in claim 1 wherein said means for moving said obturating members between the stowed position and the extended position comprises fluid operated means.

6. A vehicle as claimed in claim 1 wherein the means for supplying pressurized gaseous fluid includes an air moving fan.

7. A vehicle as claimed in claim 1 wherein the means for supplying pressurized gaseous fluid includes an air moving fan, and wherein movement of the obturating members between the stowed position and the extended position is controlled by automatic means linked to the fan to move the obturating members when the rotational speed of the fan falls below a predetermined level.

8. A vehicle as claimed in claim 1 further comprising independent auxiliary blower means for supplying pressurized gaseous fluid to said cushion when said obturating members close off the said duct.

9. A vehicle which, during at least one phase of operation, receives support from at least one ground effect cushion of pressurized gaseous fluid, said vehicle comprising means for supplying pressurized gaseous fluid to said cushion, said means including at least one duct, said duct having disposed therein structure spaced from the walls of the duct, at least part of the outer surface of said structure being in the form of at least two flaps hingedly attached to said structure and being movable from a stowed position where said flaps form a continuum of the outer surface of said structure to an extended position where said flaps constitute means for closing off said duct to prevent the supporting cushion from dissipating back through said duct in the event that said means for supplying pressurized gaseous fluid is insufficient to maintain said cushion, said vehicle further comprising independent auxiliary blower means operable for supplying pressurized gaseous fluid to said cushion when said flaps close off the said duct.

10. A vehicle which, during at least one phase of operation, receives support from at least one ground effect cushion of pressurized gaseous fluid, said vehicle including means for supplying pressurized gaseous fluid to said cushion, said means including at least one duct, means disposed in said duct and forming a portion of the walls thereof including obturator means for controlling passage of gaseous fluid therethrough, said obturator means comprising at least two obturating members and means for moving said obturating members between a first, stowed position and a second, extended position, said obturator members in the stowed positions thereof constituting means for forming a continuum of a surface of the duct wall and in the extended positions thereof constituting means for completely closing off said duct to prevent gaseous fluid from passing through the duct whereby leakage from the cushion through the duct is prevented, said obturator members comprising hinged flaps, and said means disposed in said duct substantially dividing said duct into two duct passages, each of said hinged flaps closing off one of said duct passages in the extended position thereof.

11. A vehicle in accordance with claim 10 wherein said means disposed in said duct further comprises means for housing at least one gearbox and at least part of a transmission system for supplying power to an air moving propeller.

12. A vehicle as claimed in claim 11 wherein said flaps provide access to said gearbox and transmission system.

13. A vehicle which, during at least one phase of operation, receives support from at least one ground effect cushion of pressurized gaseous fluid, said vehicle including means for supplying pressurized gaseous fluid to said cushion, said means including at least one duct, means disposed in said duct and forming a portion of the walls thereof including obturator means for controlling passage of gaseous fluid therethrough, said obturator means comprising at least two obturating members and means for moving said obturating members between a first, stowed position and a second, extended position, said obturator members in the stowed positions thereof constituting means for forming a continuum of a surface of the duct wall and in the extended positions thereof constituting means for completely closing off said duct to prevent gaseous fluid from passing through the duct whereby leakage from the cushion through the duct is prevented, said obturating members, when in the extended position, being biassed to remain in the extended position by the pressure of the gaseous fluid cushion.

References Cited

UNITED STATES PATENTS

| | | | |
|---|---|---|---|
| 3,050,146 | 8/1962 | Crim | 180—7 |
| 3,106,260 | 10/1963 | Bollum | 180—7 |
| 3,174,572 | 3/1965 | Eggington et al. | 180—7 |
| 3,330,240 | 7/1967 | Hardy et al. | 180—7 X |

FOREIGN PATENTS

| | | | |
|---|---|---|---|
| 980,570 | 1/1965 | Great Britain. | |

A. HARRY LEVY, *Primary Examiner.*

U.S. Cl. X.R.

180—129